United States Patent
Filardo et al.

(10) Patent No.: US 10,060,406 B2
(45) Date of Patent: Aug. 28, 2018

(54) APPARATUSES, METHODS AND SYSTEMS FOR HARNESSING FLUID FLOW WITH FLEXIBLE MECHANICAL TRANSDUCERS

(71) Applicant: Pliant Energy Systems LLC, Brooklyn, NY (US)

(72) Inventors: Benjamin Pietro Filardo, New York, NY (US); Daniel S. Zimmerman, Brooklyn, NY (US); Michael I. Weaker, Brooklyn, NY (US)

(73) Assignee: Pliant Energy Systems LLC, Brooklyn, NY (US)

( * ) Notice: Subject to any disclaimer, the term of this patent is extended or adjusted under 35 U.S.C. 154(b) by 0 days.

(21) Appl. No.: 15/211,763

(22) Filed: Jul. 15, 2016

(65) Prior Publication Data
US 2017/0016424 A1   Jan. 19, 2017

Related U.S. Application Data

(60) Provisional application No. 62/194,110, filed on Jul. 17, 2015.

(51) Int. Cl.
*F03B 13/10* (2006.01)
*F03B 17/06* (2006.01)

(52) U.S. Cl.
CPC ........... *F03B 13/10* (2013.01); *F03B 17/061* (2013.01); *F05B 2220/706* (2013.01); *F05B 2240/31* (2013.01); *Y02E 10/22* (2013.01); *Y02E 10/28* (2013.01)

(58) Field of Classification Search
CPC ........... F05B 2240/31; F05B 2220/706; F03B 13/10; F03B 17/061; Y02E 10/22; Y02E 10/28
See application file for complete search history.

(56) References Cited

U.S. PATENT DOCUMENTS

| 4,371,788 A | * | 2/1983 | Smith, Jr. | F03B 13/185 290/42 |
| 4,387,318 A | * | 6/1983 | Kolm | F03B 13/141 310/330 |

(Continued)

OTHER PUBLICATIONS

"Anaconda Bulge Wave Power Generator," REUK.cauk—The Renewable Energy Website, Sep. 24, 2014 [online], [retrieved on Jul. 11, 2016]. Retrieved from internet: URL: http://www.reuk.co.uk/Anaconda-Bulge-Wave-Power-Generator.htm.

(Continued)

*Primary Examiner* — Sean Gugger
(74) *Attorney, Agent, or Firm* — Irell & Manella, LLP

(57) ABSTRACT

The APPARATUSES, METHODS AND SYSTEMS FOR HARNESSING FLUID FLOW WITH FLEXIBLE MECHANICAL TRANSDUCERS include mechanisms that include flexible elements with strained deformations. In some implementations, oscillations of strained deformations in fins are excited by a moving fluid. By coupling the fin structure to an electrical generator and/or pump, energy from the moving fluid can be converted into electrical energy or used to perform useful mechanical work. In some implementations, the fin may be coupled to a motor or other actuator which causes the strained deformations to move, thereby imparting force onto the fluid to move or mix fluid or perform other useful work.

19 Claims, 10 Drawing Sheets

(56) References Cited

U.S. PATENT DOCUMENTS

| | | | | |
|---|---|---|---|---|
| 4,476,397 | A * | 10/1984 | Lawson | F03D 5/06 290/42 |
| 5,826,535 | A * | 10/1998 | Shaw | G09F 17/00 116/173 |
| 6,952,058 | B2 * | 10/2005 | McCoin | F03D 1/025 290/44 |
| 7,737,608 | B2 * | 6/2010 | Ruggeri | H01L 41/0933 310/328 |
| 8,102,072 | B2 * | 1/2012 | Tsou | F03D 5/00 290/55 |
| 8,426,999 | B2 * | 4/2013 | Drevet | E21B 41/0085 290/43 |
| 8,432,057 | B2 | 4/2013 | Filardo | |
| 8,610,304 | B2 | 12/2013 | Filardo | |
| 9,109,570 | B2 * | 8/2015 | Jarvinen | F03B 13/182 |
| 9,157,417 | B2 * | 10/2015 | Kassianoff | B63H 1/36 |
| 2002/0146333 | A1 * | 10/2002 | Drevet | F04F 7/00 417/410.1 |
| 2007/0297903 | A1 * | 12/2007 | Morris | F03B 17/06 416/132 A |
| 2008/0129254 | A1 * | 6/2008 | Frayne | F03B 17/06 322/3 |
| 2009/0121489 | A1 * | 5/2009 | Kawai | F03D 5/06 290/55 |
| 2010/0078941 | A1 * | 4/2010 | Filardo | F03B 13/188 290/52 |
| 2010/0102565 | A1 * | 4/2010 | Gartner | F03B 5/00 290/54 |
| 2014/0023481 | A1 * | 1/2014 | Drevet | F03B 5/00 415/90 |

OTHER PUBLICATIONS

PCT Search Report and Written Opinion for PCT/US16/42602 dated Dec. 2, 2016.

* cited by examiner

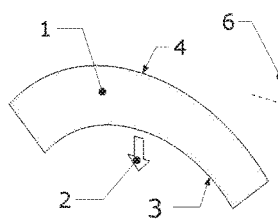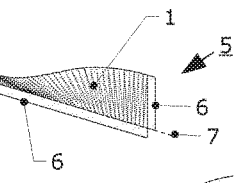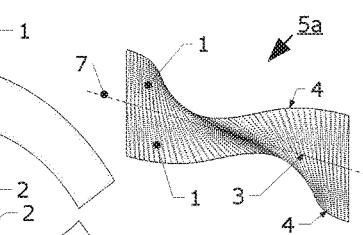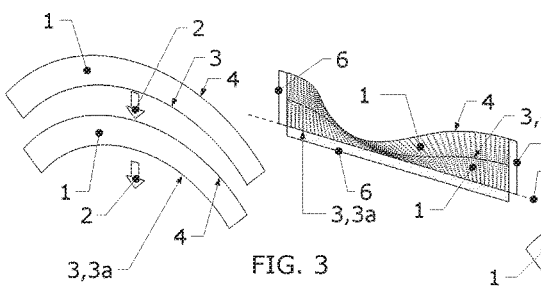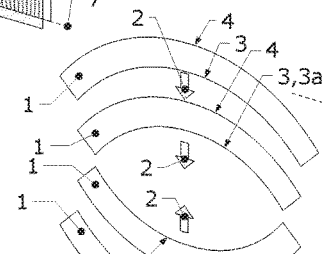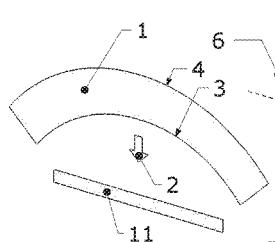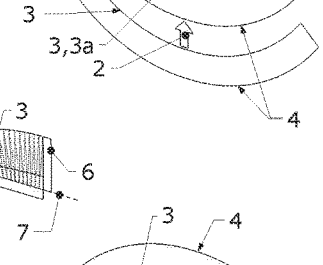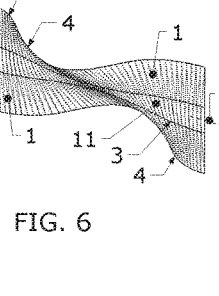

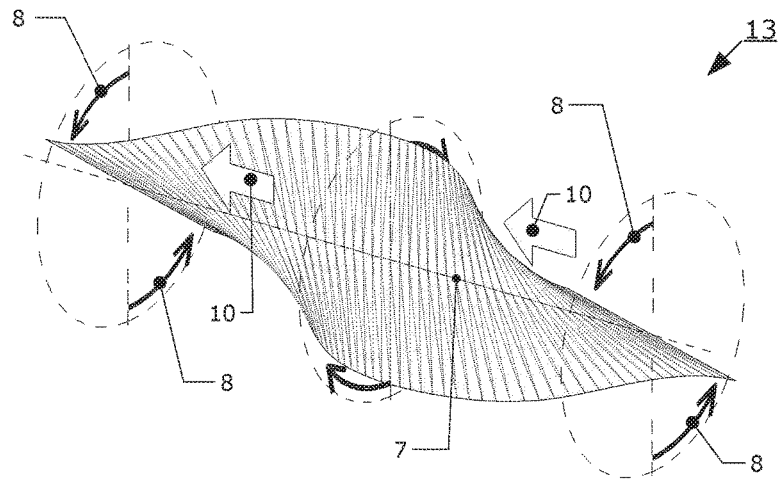
FIG. 7
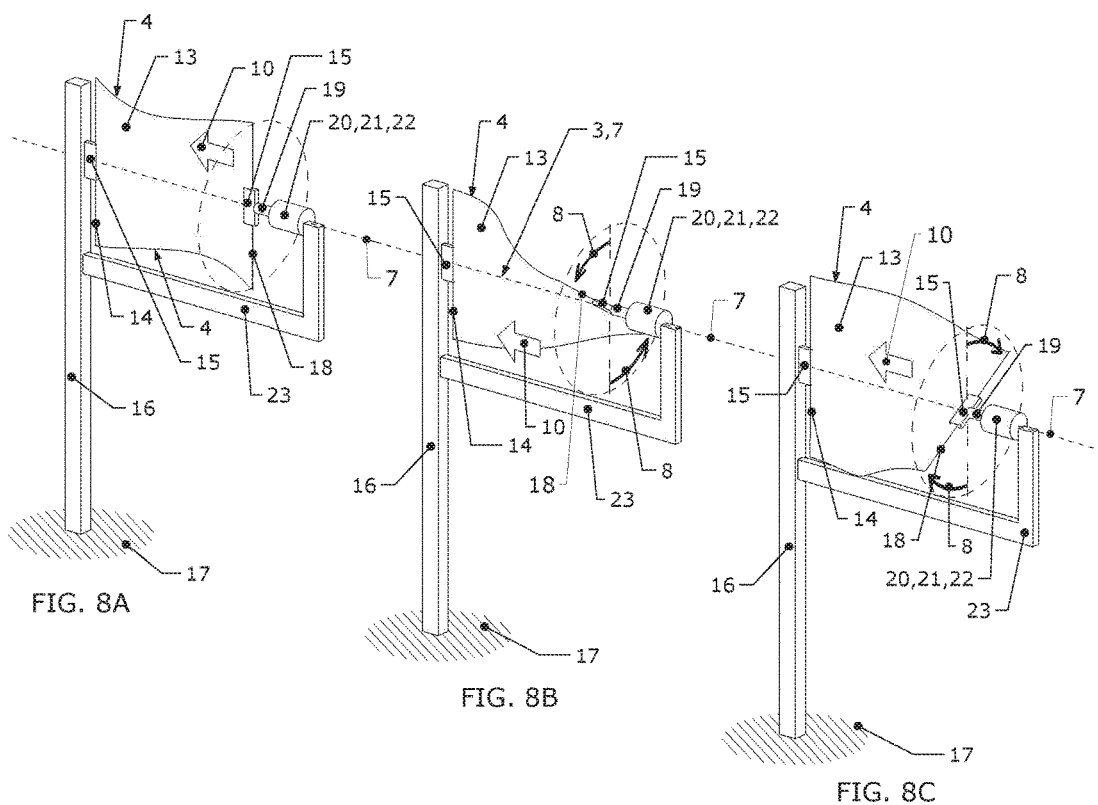
FIG. 8A
FIG. 8B
FIG. 8C

APPARATUSES, METHODS AND SYSTEMS FOR HARNESSING FLUID FLOW WITH FLEXIBLE MECHANICAL TRANSDUCERS

This application for letters patent disclosure document describes inventive aspects that include various novel innovations (hereinafter "disclosure") and contains material that is subject to copyright, mask work, and/or other intellectual property protection. The respective owners of such intellectual property have no objection to the facsimile reproduction of the disclosure by anyone as it appears in published Patent Office file/records, but otherwise reserve all rights.

PRIORITY CLAIM

This application is a Non-Provisional of, and claims priority under 35 U.S.C. § 119(e) to, prior U.S. provisional patent application Ser. No. 62/194,110, filed Jul. 17, 2015, entitled, "APPARATUSES, METHODS AND SYSTEMS FOR HARNESSING FLUID FLOW WITH FLEXIBLE MECHANICAL TRANSDUCERS". The entire contents of the aforementioned application are expressly incorporated herein by reference.

FIELD

The present innovations generally address energy conversion, and more particularly, include APPARATUSES, METHODS AND SYSTEMS FOR HARNESSING FLUID FLOW WITH FLEXIBLE MECHANICAL TRANSDUCERS.

BACKGROUND

The kinetic energy of fluid flow can be harnessed and converted via an electromagnetic generator or other generator, or harnessed to perform useful mechanical work, such as pumping. Various designs have been developed for transducers, motors, power generators, and the like to facilitate the conversion of energy from one form to another.

BRIEF DESCRIPTION OF THE DRAWINGS

The accompanying appendices and/or drawings illustrate various non-limiting, example, innovative aspects in accordance with the present descriptions:

FIG. 1 shows aspects of formation of a crenated strip in one embodiment;

FIG. 2 shows aspects of two crenated strips coupled together across a central longitudinal axis in one embodiment;

FIG. 3 shows aspects of formation of a crenated strip in another embodiment.

FIG. 4 shows aspects of crenated strips coupled together across a central longitudinal axis in another embodiment;

FIG. 5 shows aspects of formation of a crenated strip in another embodiment;

FIG. 6 shows aspects of formation of a crenated strip in another embodiment;

FIG. 7 shows rotational aspects of a fin under operation;

FIGS. 8 A-C show a dynamic sequence of a fin under operation;

DETAILED DESCRIPTION

Figure 9:
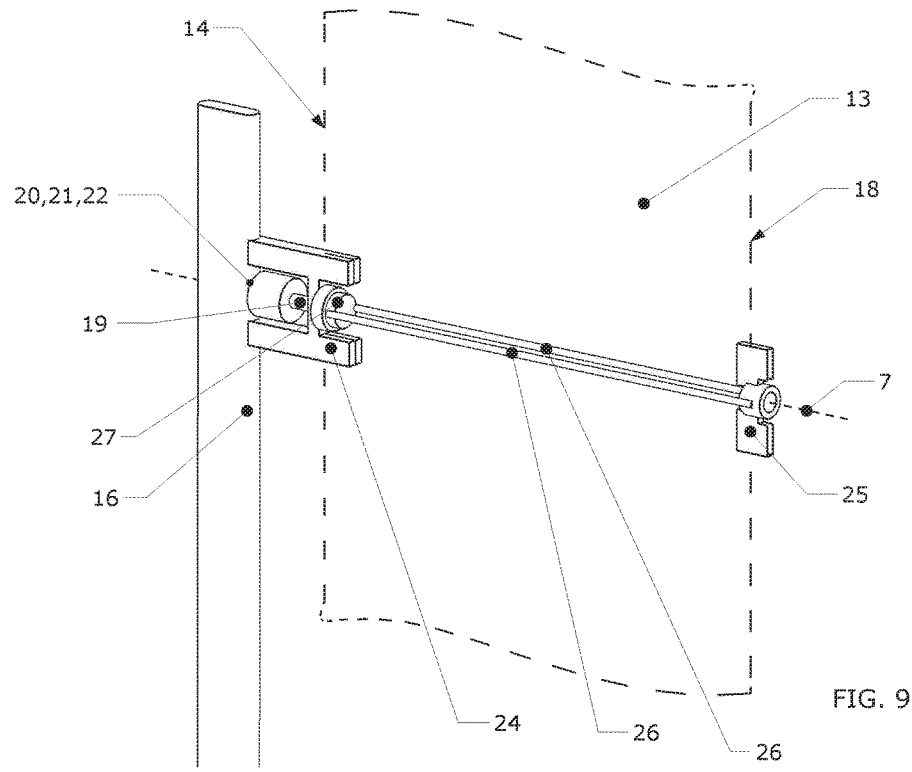
FIG. 9 shows a mounted fin in another embodiment.

In one embodiment, an arch-like planar member of flexible material 1 may have force 2 exerted upon it causing a straightening or partial straightening of the arch's inner edge 3 which may cause its outer edge 4 to take on one or more strained deformations that take on a pseudo-sinusoidal shape (e.g., wave-like deformations), FIG. 1, which taper in amplitude towards the inner edge 3. Once in this strained and deformed shape, one or more restraining elements 6 fixed in place may maintain the planar member 1 in its strained and deformed shape as a type-one crenated strip 5.

In one embodiment, two arch-shaped planar members of flexible material 1 may have force exerted upon them 2 causing a straightening or partial straightening of their inner edges 3 causing their outer edges 4 to take on one or more wave-like strained deformations to form two type-one crenated strips 5. The two inner edges 3 of each may be coupled together across a central longitudinal axis 7 which may maintain the strained deformations since each type-one crenated strip may act as a restraining element 6 for the other, FIG. 2. When configured together in this manner, two type-one crenated strips 5 may form a type-two crenated strip 5a.

In another embodiment, two or more arch-shaped planar members of flexible material 1, each with an inner edge 3 and an outer edge 4, are coupled together so that the inner edge 3 of one is attached to the outer edge 4 of the other. Forces 2 exerted may cause straightening or partial straightening of the innermost inner edge 3a to form a type-3 crenated strip 9, FIG. 3. In one implementation, a length of an inner edge 3 of one arch-shaped planar member and the outer edge 4 of a second arch-shaped planar member may be selected so as to produce an approximately equal length when attached in a deformed state.

In one implementation, two type-three crenated strips 9 are coupled about their innermost edge 3a along a central longitudinal axis 7 to form a type-four crenated strip 9a, FIG. 4.

In another embodiment, one or more arch-shaped planar members of flexible material 1 are assembled whereby the inner edge 3, or innermost edge 3a of one, is coupled to a straight or substantially straight planar member of flexible material 11 with the application of force 2, causing the assembly to take on wave-like deformations, FIG. 5, which may be kept from returning to an unstrained state with restraining elements 6. In one implementation, two or more arch-shaped planar members of flexible material 1 are each coupled about their inner edges 3 to either side of a straight or substantially straight planar member of flexible material 11, FIG. 6, to create a type-five crenated strip 12, in which the straight or substantially straight planar member of flexible material 11 may be bisected by the central longitudinal axis 7.

The term fins 13 is hereinafter used to encompass any or all of the type-two crenated strip 5a, type-four crenated strip 9a, and type-five crenated strip 12. The morphology of a fin 13 is an expression of its internal energy state which, in one implementation, maintains the energy from the force 2 exerted upon the arch-shaped planar members of flexible material 1, e.g., during the assembly described above. These undulations, or deformations, may travel along the central longitudinal axis 7, such as with the application of a secondary force 10, e.g., from fluid flow or other load source. The traveling undulations may be expressed as reciprocating rotations of regions of the fin 13 about the longitudinal axis 7 of the fin 13. Continuous directional force 10 may cause the axis of the fin 13 at any given point to rotate sequentially through some angle clockwise and counter-clockwise, FIG. 7.

In one embodiment, FIGS. 8A-8C, the first end 14 of a fin 13 is fixed in one or more locations, such as via an edge-coupling member 15, to a supporting member 16 which may be secured to an immovable substrate or object, 17. The second end 18 of the fin 13 may be coupled via an edge-coupling member 15 in one or more locations to a shaft 19 which, in one implementation, is coupled to the rotor of an electromagnetic generator 20, or to the driving mechanism of a pump 21, or other transducer 22 capable of converting rotation into electrical energy or useful mechanical work. Conversely, the transducer 22 may be an actuator capable of turning electrical energy input into mechanical work, e.g., to create motion of the fin 13, such as for a fan, fluid-mixing device, propeller, and/or the like. In one implementation, the electromagnetic generator 20, pump drive mechanism 21 or other transducer 22 is fixed to a second supporting member 23, which may be fixed to the first supporting member 16 or other immovable substrate or object 17.

FIGS. 8A-8C show an embodiment in three states of motion induced by fluid flow 10 or other force causing the deformations of the fin 13 to travel in the direction of fluid flow 10 which in turn may cause the second end 18 of the fin 13 to rotate a shaft 19 which rotates an electromagnetic generator 20, pump drive mechanism 21 or other transducer 22.

Figures 10A, 10B, 10C:
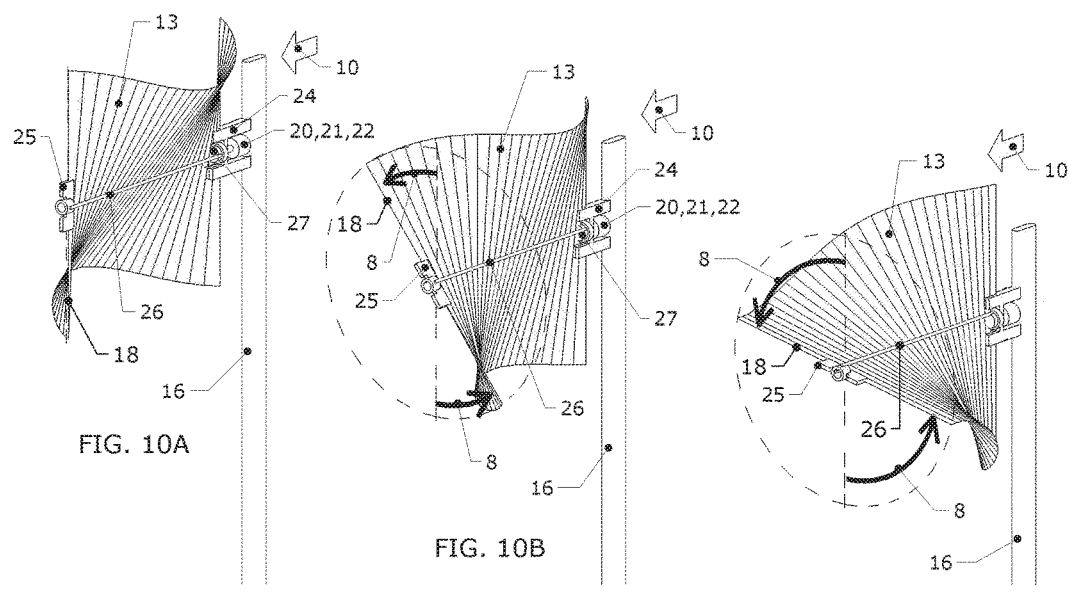
FIGS. 10 A-C show a dynamic sequence of characteristics of another embodiment under operation.

In another embodiment, FIG. 9, the fin 13 is connected at its first end 14 to a first edge-coupling component 24 that is fixed to a supporting member 16, and at its second end 18 is fixed to a second edge coupling component 25. The second edge coupling component 25 may be fixed to one or more force-displacement bars 26 which extend parallel to the longitudinal axis 7, where the force-displacement bars 26 are coupled, e.g. rotationally, to a first edge coupling mechanism 24, such as via gears or other rotational linkage 27, which may turn a shaft 19 to power a generator 20, pump drive mechanism 21 or other transducer 22. FIG. 9 illustrates this embodiment with the fin 13 shown as a dotted outline for visual clarity. FIGS. 10A-10C illustrate the embodiment described above under operation in one implementation, with directional force 10 causing the deformations of the fin 13 to travel in the direction of the force 10 which induces rotation 8 of the second end 18 of the fin 13 which is coupled to the second edge coupling component 25. In this implementation, rotation of the second edge coupling component 25 causes rotation via the force-displacement bar or bars 26 of a rotational linkage 27 that passes through the first edge coupling mechanism 24 to a shaft 19 to power an electromagnetic generator 20, pump drive mechanism 21 or other transducer 22.

Figure 11:
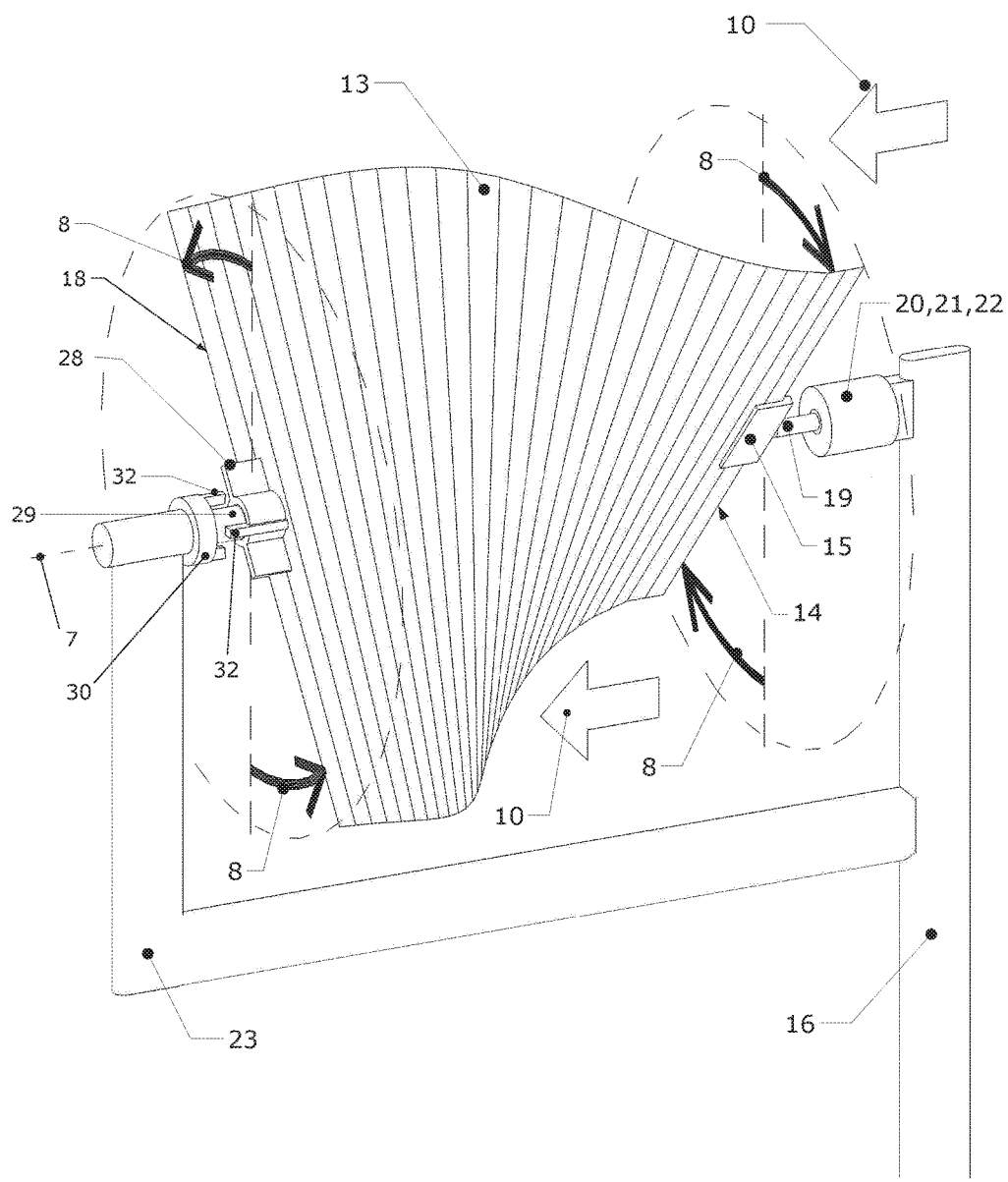
FIG. 11 shows another embodiment and dynamic characteristics under operation.

In another embodiment, both a first end 14 and second end 18 of the fin 13 may rotate 8 under operation about a longitudinal axis 7, FIG. 11. In this embodiment, the fin 13 is coupled at one end 14 to an edge-coupling member 15 that is attached to a shaft 19 attached to an electromagnetic generator 20 and/or the like. The fin 13 may be coupled at its other end to a second edge-coupling member 28 which may rotate about a longitudinal axis 7 via a shaft 29 rotationally coupled to the second edge-coupling member 28 and an end component 30. The end component 30 is fixed to a supporting member 16 or secondary supporting member 23 fixed to the supporting member 16. The degree of rotation of the second edge-coupling member 28 is limited by mechanical stoppers 32 and/or the like on the second edge-coupling member 28, which engage with mechanical stoppers 32 and/or the like on the end component 30. This prevents the fin 13 from going into full body rotation about its longitudinal axis 7, by preventing the end coupling member from rotating beyond a limit set by the arrangement of mechanical stoppers 32.

The travel of deformations along the fin 13 corresponds with partial rotation of the fin 13 whereby the rotational position, or phase position of one part of the fin 13 may be out of phase with other parts. Parts of the fin 13 with dissimilar phase positions and with opposite rotational directions may be mechanically linked to turn a common shaft 19 attached to an electromagnetic generator 20 and/or the like, FIGS. 12-13. In one implementation, the fin 13 is bifurcated about its longitudinal axis 7 by at least one axial member 33 coupled at one end to a first region of the fin 13 via an edge coupling member 15, and at the other end to a gear mechanism 34 that turns a shaft 19 attached to an electromagnetic generator 20 and/or the like.

Figure 12:
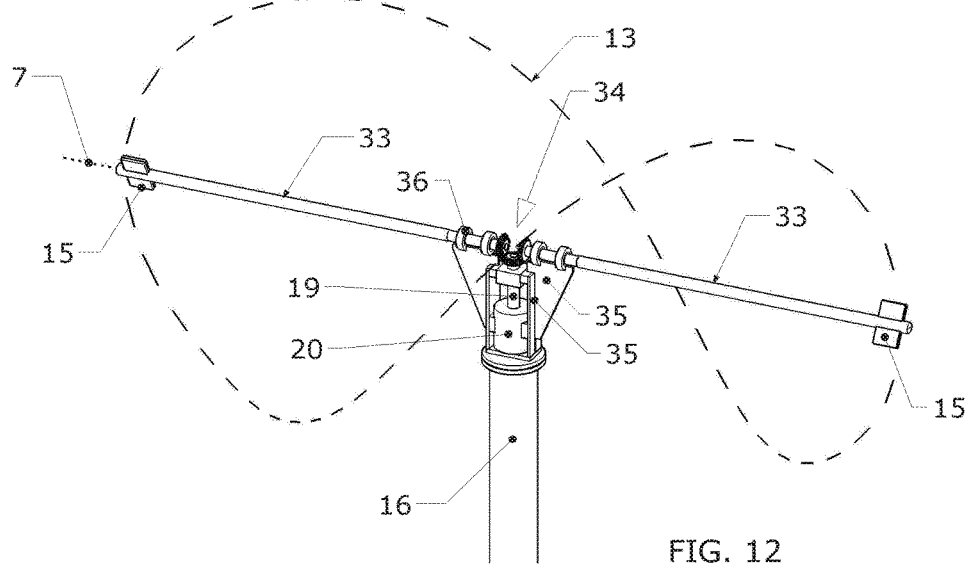
FIG. 12 shows another embodiment with two axial members turning a common shaft.
Figure 13:
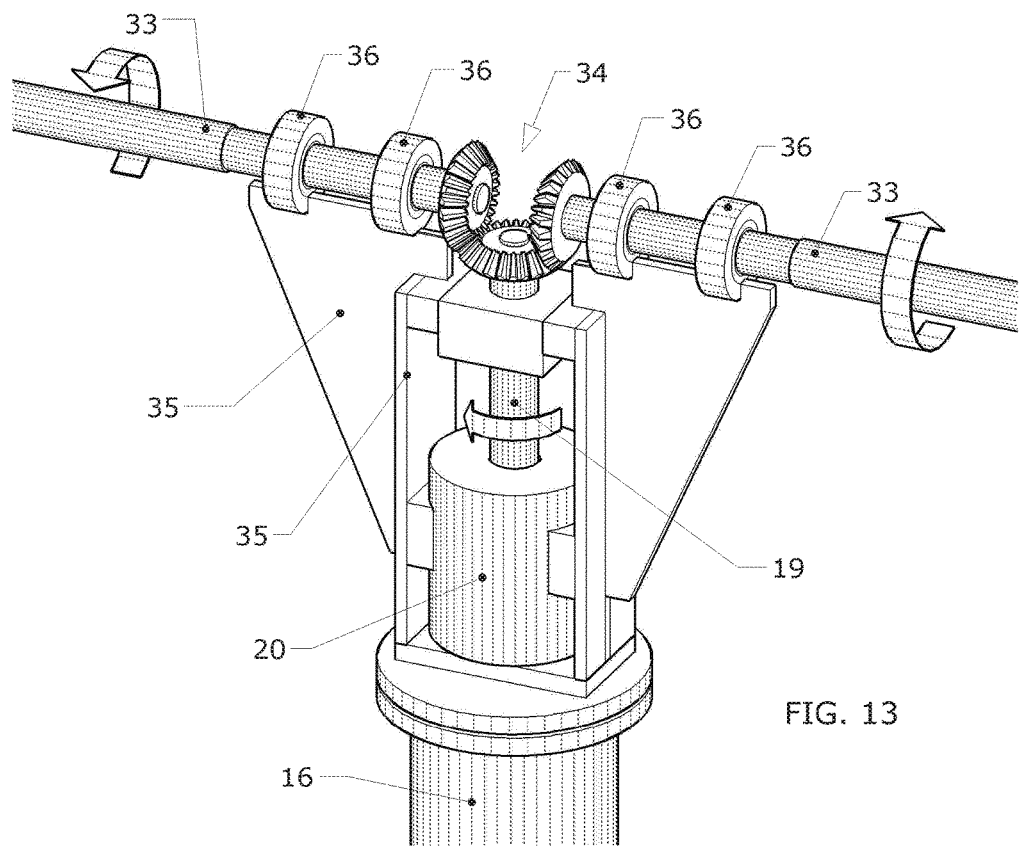
FIG. 13 shows a close up view of the central portion of the embodiment shown in FIG. 12.

FIG. 12 shows one implementation in which two axial members 33 are attached to either end of the fin 13 and power an electromagnetic generator 20 and/or the like through a gear mechanism 34, such as a beveled gear assembly, coupled to a common shaft 19. An electromagnetic generator 20 may be mounted via a rigid chassis 35 to a supporting member 16. The axial members 33 may be coupled to the chassis 35 via bearing elements 36 that allow the axial members 33 to rotate relative to the chassis 35. The profile of the fin 13 in FIG. 12 is shown as a dotted line for visual clarity. FIG. 13 is a close-up view of the chassis 35 showing how it interfaces with the axial members 33, gear mechanism 34, electromagnetic generator 20 and/or the like, and the supporting member 16, and showing how the axial members 33 may rotate in opposite directions while turning the shaft 19 in one direction.

Figure 14:
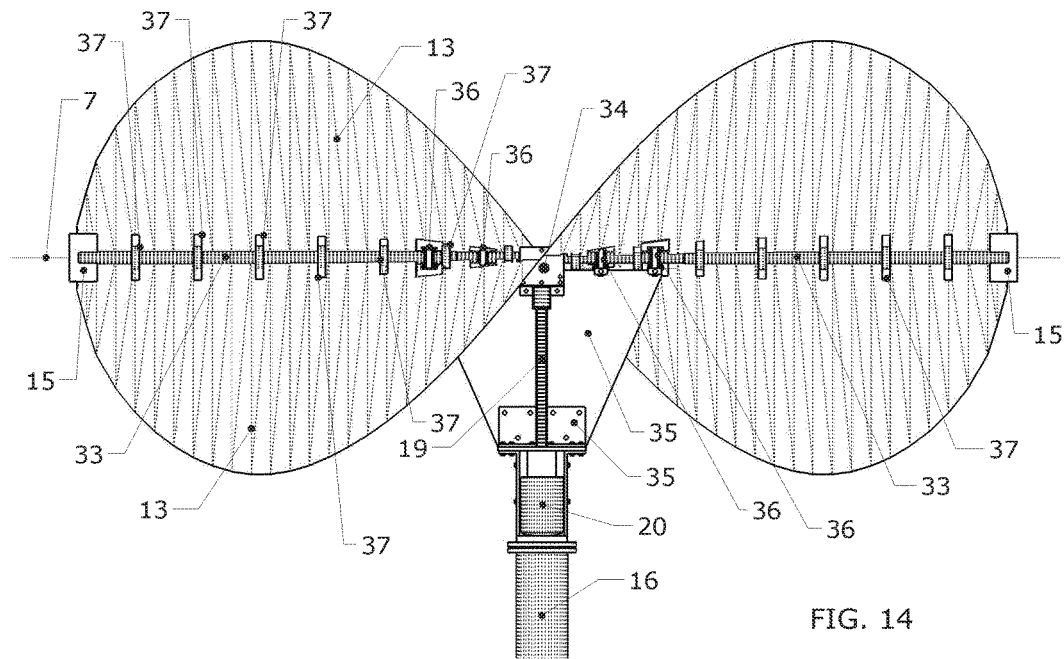
FIG. 14 shows a side elevation view of another implementation with two axial members turning a common shaft.
Figure 15:
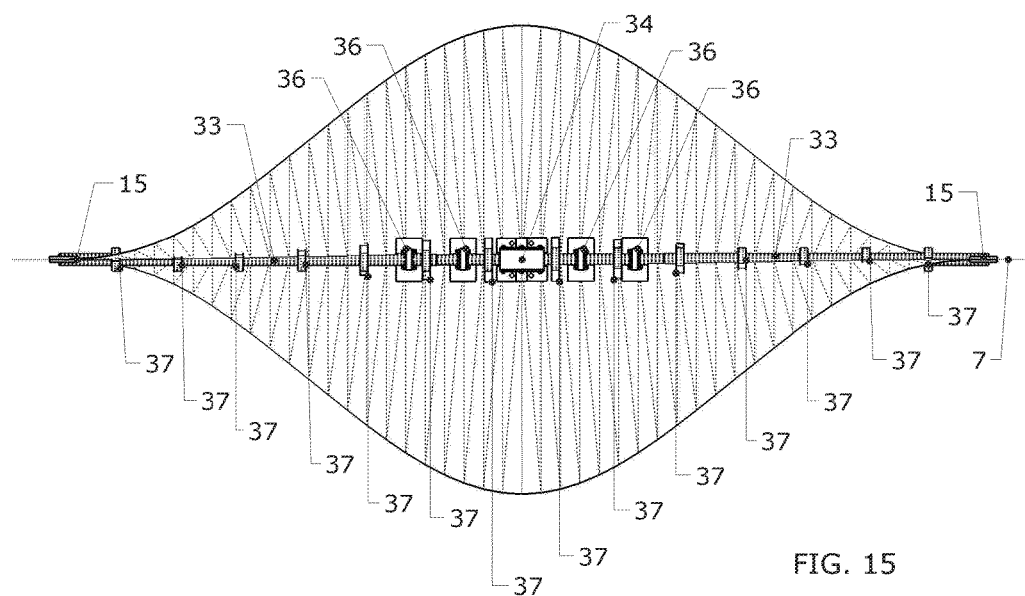
FIG. 15 shows a top view of the embodiment shown in FIGS. 12-14.

FIG. 14 shows, in another implementation, a side view of two halves of the fin 13 coupled together via ring brackets 37 so that both halves are locked into a shared rotational position. The gear mechanism 34 may be a gear box with beveled gears and counter-rotating output shafts, for example, or a differential, or other type of gearbox. FIG. 15 shows a top view of the implementation shown in FIG. 14.

Figure 16:
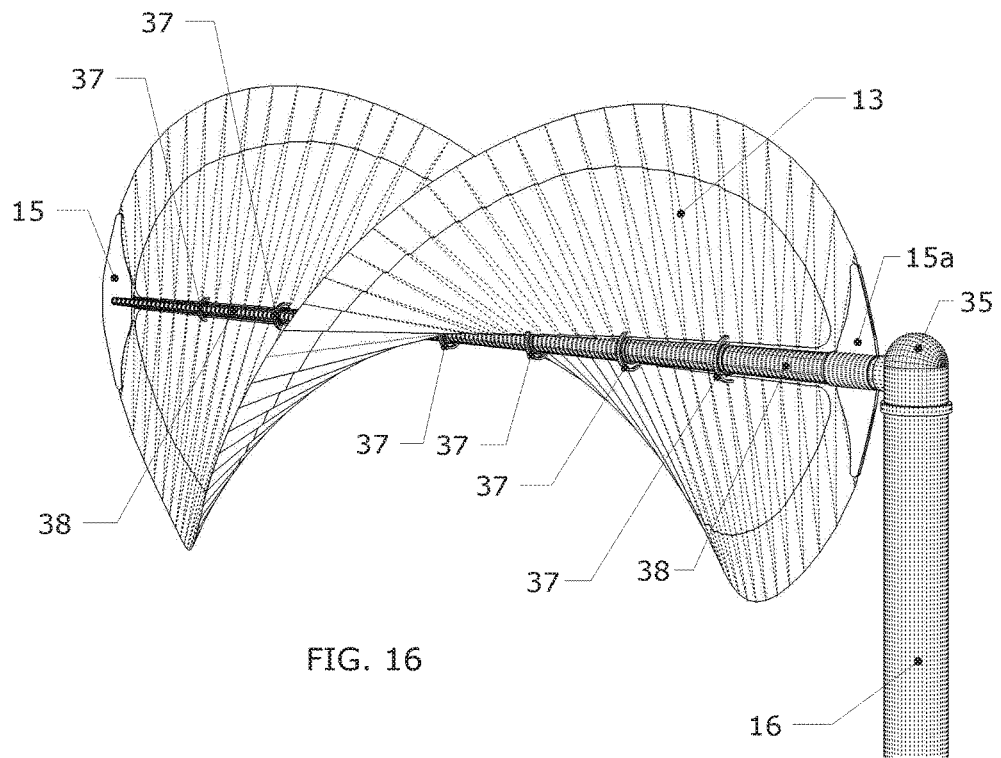
FIG. 16 shows another embodiment with a boom arm.
Figure 17:
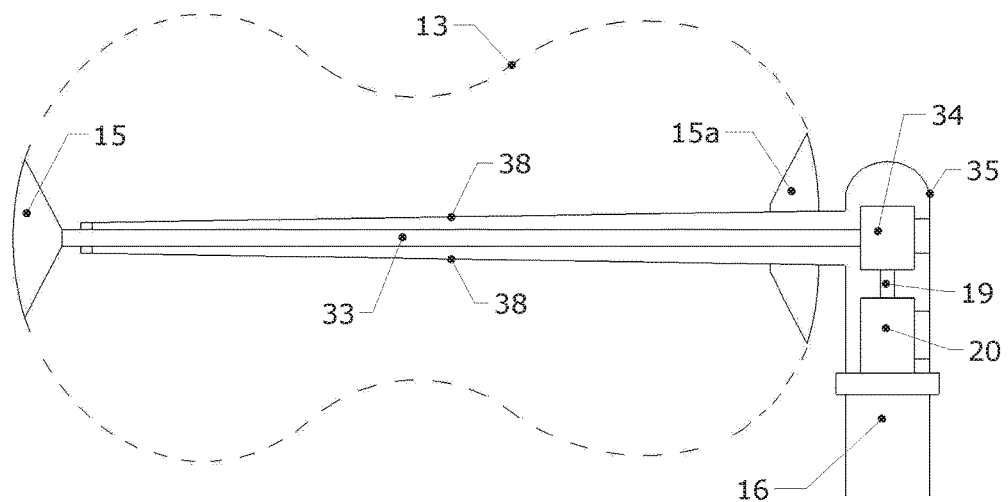
FIG. 17 is a simplified schematic elevation of the embodiment shown in FIG. 16.

FIGS. 16-17 show an embodiment in which one end of a fin 13 is attached to an edge-coupling member 15 which is attached to an axial shaft 33. The other end of the fin 13 may be coupled to an edge-coupling member 15a which is fixed to a boom 38, which is rigidly fixed to a chassis 35 which is fixed to a supporting member 16. In one implementation, the end of the fin 13 coupled to the boom 38 via an edge-coupling member 15a may be substantially restrained from rotating. In one implementation, the axial shaft 33 is rotationally coupled to a gearbox 34 which turns a shaft 19 which turns an electromagnetic generator 20 and/or the like. In one implementation, the axial shaft 33 is housed within the boom 38. The boom 38 provides support for the fin 13 and provides a surface around which the ring brackets 37 may rotate. The ring brackets 37 may rotate around the surface of the boom 38, e.g., by sliding or may contain bearings for reduced friction. The gear box 34 and electromagnetic generator 20 and/or the like are fixed to the chassis 35. FIG. 16 shows a perspective view of this embodiment and FIG. 17 shows a schematic sectional view in which the profile of the fin 13 is shown as a dotted line for visual clarity.

Figure 18:
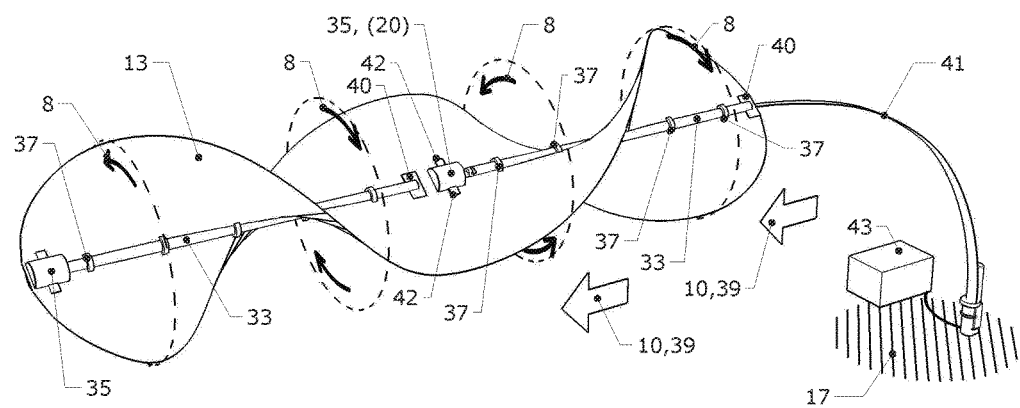
FIG. 18 shows an embodiment with multiple power take-off regions.

It has been disclosed how directional force such as fluid flow 10 may cause traveling wave deformations along a fin 13 which may have an affect whereby regions of a fin 13 may rotate 8 in different directions relative to each other. An elongate fin 13 with multiple deformations may have multiple locations suitable for power take-off. FIG. 18 is an example of an embodiment with multiple deformations with regions that rotate 8 in different directions relative to each other as described above.

Figure 19:
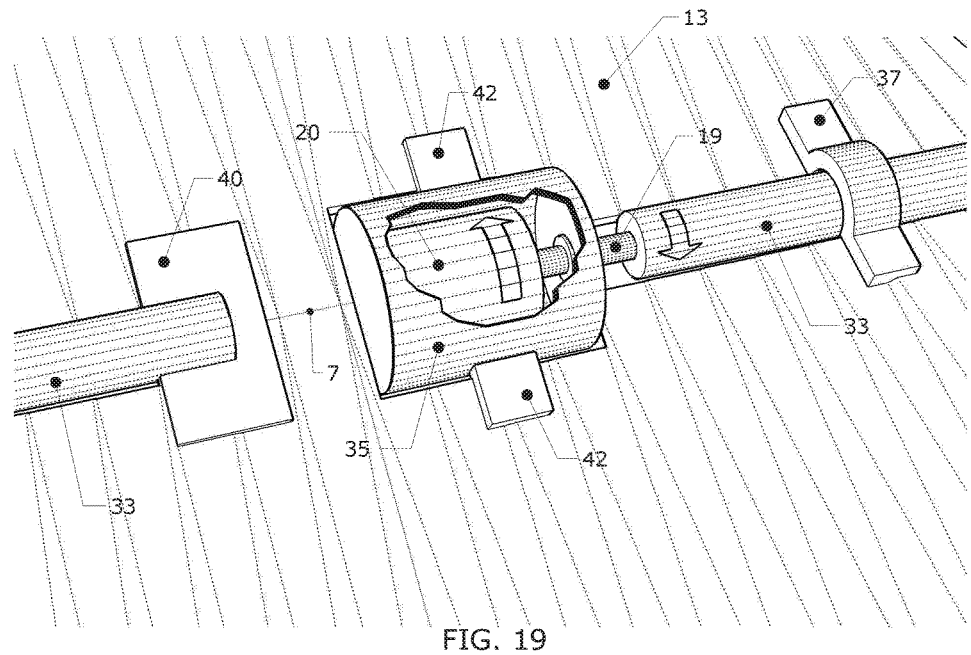
FIG. 19 is a close up view of a central region of the embodiment shown in FIG. 18.

In this implementation, a fin 13 that may be in flowing water or other fluid 10, 39 is tethered 41 to a fixed or immovable object or substrate 17. A fin coupling member 40 at one end of the fin 13 may be coupled to the tether 41. An axial shaft 33 is connected at one end to the fin coupling member 40, and at the other end to the shaft 19 of an electromagnetic generator 20 and/or the like. In one implementation, the electromagnetic generator 20 and/or the like may be fixed inside a chassis 35 which is coupled to the fin 13 by one or more chassis-coupling members 42, FIG. 19. In one implementation, the axial shaft 33 passes through and may rotate relative to ring brackets 37 which are coupled to the fin 13. Under operation the chassis 35, to which the electromagnetic generator 20 and/or the like if fixed, may rotate relative to the axial shaft 33, causing the generator 20 and/or the like to rotate relative to the axial shaft 33. FIG. 19 shows a close up view of a middle portion of the implementation shown in FIG. 18.

Energy from the moving fluid 10, 39 may be harnessed in the electromagnetic generator 20 and/or the like. One or more additional axial shafts 33 turning electromagnetic generators 20 and/or the like, in a manner similar to the description above, may be added along the longitudinal axis 7 for multiple power take-offs. Where power take-off is the harnessing of electricity, power may be extracted via wires leading from the electromagnetic generator/s 20, along the tether 41 to a battery 43, an electricity grid, a remote motor, and/or the like.

Figure 20:
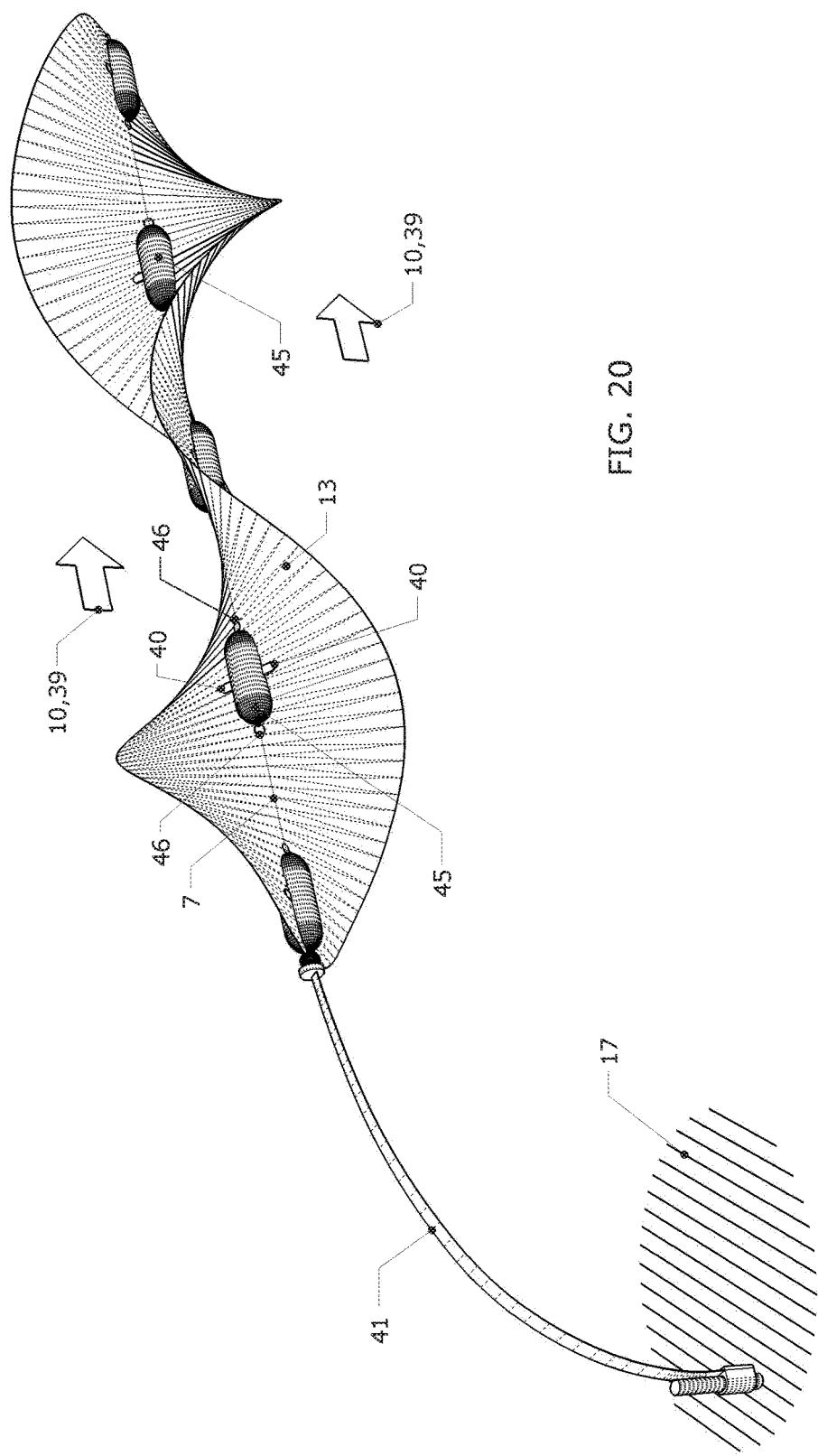
FIG. 20 shows another embodiment with pods for power take-off.
Figure 21:
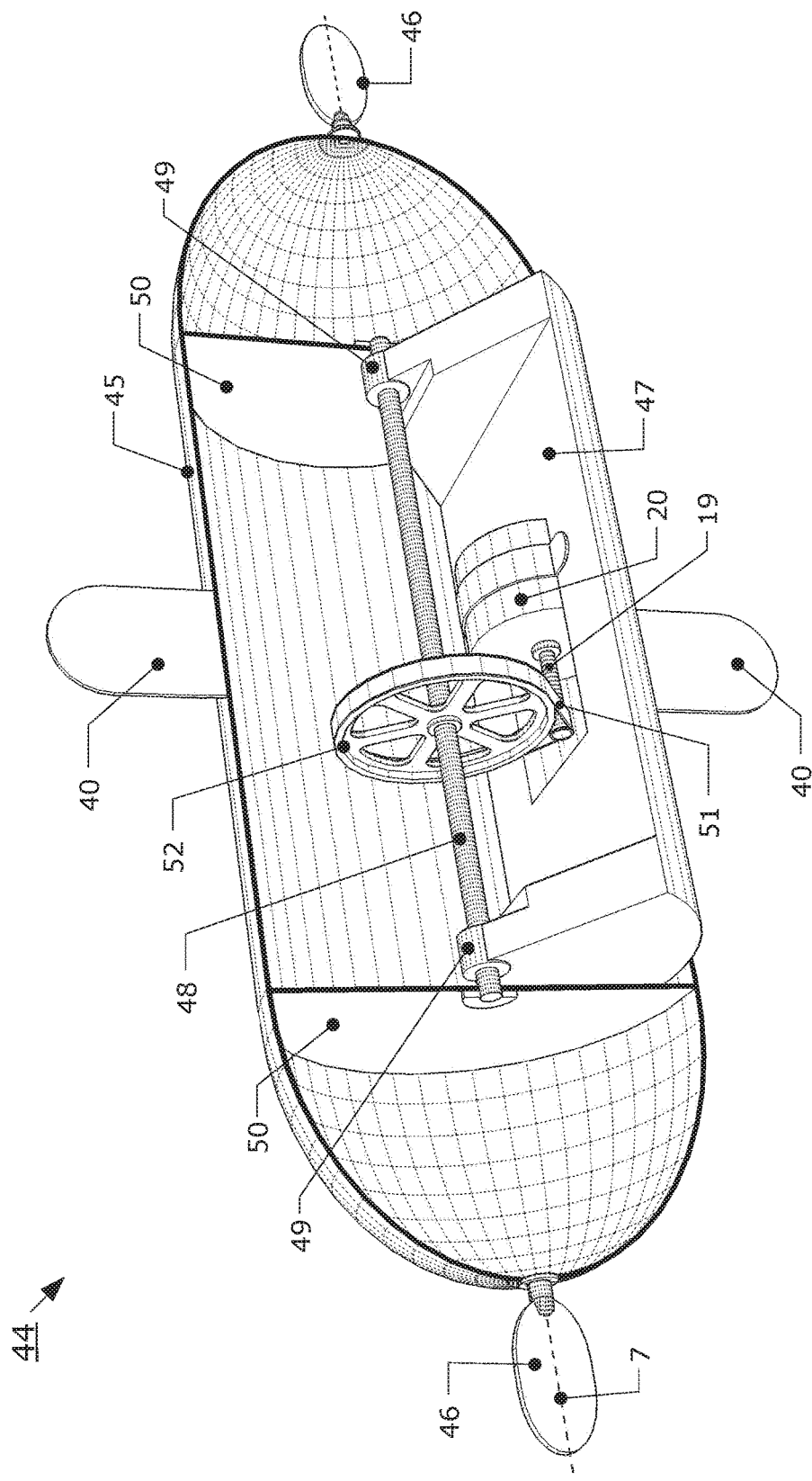
FIG. 21 shows a section view through a pod of the embodiment shown in FIG. 20.

In another embodiment, power take-off from the moving fluid 10, 39 may take place in one or more locations along the fin 13 inside pods 44, FIGS. 20-21. The pod 44 may be comprised of a chassis-like outer body 45. The chassis-like outer body 45 may be attached to the fin 13 with fin coupling members 40 that, in one implementation, may be perpendicular to the longitudinal axis 7, and with rotational fin coupling members 46 that are able to rotate about the longitudinal axis 7.

FIG. 21 shows a pod 44 sectioned to expose the power take-off mechanism inside the pod 44 in one implementation. The power take-off mechanism may utilize a heavy weight or pendulum 47 to provide reaction force for an electromagnetic generator 20 and/or the like. The rotation of the fin 13 causes the pod, to which the fin 13 is coupled, to rotate about the longitudinal axis 7 through some angle clockwise and counter-clockwise. The pendulum 47 hangs from a cross-bar 48 to which the pendulum 47 is rotationally coupled, e.g., with one or more pendulum bearings 49. The cross bar 48 is coupled to an internal structure such as support plates 50 which are coupled to the chassis-like outer casing 45. Under operation, as the pod 44 rotates clockwise and counter clockwise, the cross-bar 48 rotates with the pod 44 but the rotational position of the pendulum 47 remains substantially unchanged due to gravity. Therefore, the cross-bar 48 may rotate with respect to the pendulum 47. An electromagnetic generator 20, or the like, may be fixed to the pendulum 47. The shaft 19 of the generator 20 may be turned, for example, via a belt 51 connected to a wheel 52 fixed to the cross-bar 48, FIG. 21, or the shaft 19 may be turned by gears and/or the like.

What is claimed is:

1. An apparatus, comprising:
   at least one restraining element;
   two crenated strips coupled to each other along respective inner edges to form a double-crenated strip;
   a first edge-coupling component fixed to the at least one restraining element and coupled to a first edge of the double-crenated strip, wherein the first edge of the double-crenated strip is held in fixed orientation by the first edge-coupling component;
   a second edge-coupling component fixed to the at least one restraining element and coupled to a second edge of the double-crenated strip, wherein the second edge of the double-crenated strip is held with rotational freedom by the second edge-coupling component;
   a boom fixed to the first edge-coupling member and attached at one end to a chassis that is fixed to a supporting member;
   an axial shaft fixed to the second edge-coupling member and configured to rotate in response to rotation of the second edge of the double-crenated strip, the axial shaft housed in the boom; and
   at least one generator coupled to the axial shaft, wherein rotation of the axial shaft powers the generator.

2. The apparatus of claim 1, wherein the at least one generator is coupled to the second edge of the double-crenated strip, wherein the generator is configured to convert oscillations of the second edge of the double-crenated strip into electrical energy.

3. The apparatus of claim 1, further comprising:
   at least one pump coupled to the second edge of the double-crenated strip, wherein the pump is configured to convert oscillations of the second edge of the double-crenated strip into pumping force.

4. The apparatus of claim 1, further comprising:
   at least one motor coupled to the second edge of the double-crenated strip, wherein the motor is configured to convert electrical energy into oscillations of the second edge of the double-crenated strip.

5. The apparatus of claim 1, wherein the at least one generator is coupled to the axial shaft via a gearbox housed in the chassis.

6. The apparatus of claim 1, further comprising:
   a tether attached at a first end to a fixed substrate and at a second end to the first edge-coupling component;
   a first axial member attached at a first end to the first edge-coupling component and at a second end to a first generator; and a second axial member attached at a first end to the second edge-coupling component and at a second end to a second generator.

7. The apparatus of claim 6, wherein the first generator and the second generator are different, and further comprising:
   at least one additional axial member connecting the first generator and the second generator.

8. The apparatus of claim 7, wherein the at least one additional axial member comprises a plurality of additional axial members connecting the first generator to the second generator via at least a third generator intermediate between the first generator and second generator.

9. An apparatus, comprising:
   at least one restraining element;
   two crenated strips coupled to each other along respective inner edges to form a double-crenated strip;
   a first edge-coupling component fixed to the at least one restraining element and coupled to a first edge of the double-crenated strip; and
   at least one power take-off pod coupled to at least one of the two crenated strips;
   wherein the at least one power take-off pod comprises:
      an outer body comprising at least one fin coupling member coupled to the at least one of the two crenated strips;
      a cross-bar coupled to and fixed with respect to the outer body;
      a weighted pendulum rotationally coupled to the cross-bar;
      a generator fixed to the weighted pendulum and comprising at least one shaft;
      a wheel fixed to the cross-bar and coupled to the at least one shaft of the generator such that rotations of the wheel with respect to the weighted pendulum induce rotations of the at least one shaft of the generator.

10. The apparatus of claim 9, wherein the at least one power take-off pod is coupled by at least two fin coupling members to both of the two crenated strips.

11. An apparatus, comprising:
    at least one restraining element;
    two crenated strips coupled to each other along respective inner edges to form a double-crenated strip;
    a first edge-coupling component fixed to the at least one restraining element and coupled to a first edge of the double-crenated strip, wherein the first edge of the double-crenated strip is held with rotational freedom by the by the first edge-coupling component; and
    a second edge-coupling component fixed to the at least one restraining element and coupled to a second edge of the double-crenated strip, wherein the second edge of the double-crenated strip is held with rotational freedom by the second edge-coupling component;
    first and second axial members, wherein each of the first and second axial members is connected at a first end to, respectively, the first and second edge-coupling members and at a second end to a gear mechanism;
    a chassis attached to a supporting member and coupled to each of the first and second axial members, wherein the first and second axial members are supported by the chassis but are free to rotate; and
    at least one generator or at least one motor coupled to the gear mechanism.

12. The apparatus of claim 11, wherein the at least one generator is coupled to the second edge of the double-crenated strip, wherein the generator is configured to convert oscillations of the second edge of the double-crenated strip into electrical energy.

13. The apparatus of claim 11, further comprising:
    at least one pump coupled to the second edge of the double-crenated strip, wherein the pump is configured to convert oscillations of the second edge of the double-crenated strip into pumping force.

14. The apparatus of claim 11, wherein the at least one motor is coupled to the second edge of the double-crenated strip, wherein the motor is configured to convert electrical energy into oscillations of the second edge of the double-crenated strip.

15. The apparatus of claim 11, wherein the first and second axial members are coupled to the chassis via one or more bearings.

16. The apparatus of claim 11, wherein the gear mechanism comprises a gearbox having beveled gears and counter-rotating output shafts.

17. The apparatus of claim 11, wherein the at least one generator comprises:
    a first generator coupled to the first edge of the double-crenated strip, wherein the first generator is configured to convert oscillations of the first edge of the double-crenated strip into electrical energy; and
    a second generator coupled to the second edge of the double-crenated strip, wherein the second generator is configured to convert oscillations of the second edge of the double-crenated strip into electrical energy.

18. The apparatus of claim 11, wherein the at least one motor comprises:
    a first motor coupled to the first edge of the double-crenated strip, wherein the first motor is configured to convert electrical energy into oscillations of the first edge of the double-crenated strip; and
    a second motor coupled to the second edge of the double-crenated strip, wherein the second motor is configured to convert electrical energy into oscillations of the second edge of the double-crenated strip.

19. The apparatus of claim 11, wherein rotational freedom of the second edge of the double-crenated strip is limited by at least one mechanical stopper.

* * * * *